United States Patent [19]

Yoshida

[11] Patent Number: 4,528,512
[45] Date of Patent: Jul. 9, 1985

[54] TIMING SYNCHRONIZING CIRCUIT FOR DEMODULATORS

[75] Inventor: Yasuharu Yoshida, Tokyo, Japan

[73] Assignee: NEC Corporation, Tokyo, Japan

[21] Appl. No.: 585,653

[22] Filed: Mar. 2, 1984

[30] Foreign Application Priority Data

Mar. 4, 1983 [JP] Japan ................................ 58-35348

[51] Int. Cl.³ .................. H03L 7/08; H04L 27/22
[52] U.S. Cl. .............................. 329/50; 329/122; 329/124; 331/1 A; 331/23; 331/27; 375/81; 375/120
[58] Field of Search ............... 331/1 A, 23, 25, 27; 329/50, 122, 124; 375/81, 94, 120

[56] References Cited

U.S. PATENT DOCUMENTS

| | | | |
|---|---|---|---|
| 4,057,762 | 11/1977 | Namiki | 329/50 |
| 4,255,713 | 3/1981 | Yoshida | 329/124 X |
| 4,423,518 | 12/1983 | Hirosaki | 331/1 A X |

*Primary Examiner*—Siegfried H. Grimm

*Attorney, Agent, or Firm*—Sughrue, Mion, Zinn, Macpeak, and Seas

[57] ABSTRACT

In a timing synchronizing circuit wherein a timing signal is regenerated from a baseband signal subjected to a bandwidth limitation, there are provided a voltage controlled oscillator whose oscillation frequency varies in accordance with a control signal, an A/D converter which samples and shapes the baseband signal by utilizing the output of the voltage controlled oscillator, a decision circuit for deciding the polarity of a differential coefficient of the baseband signal at an optimum sampling point on the basis of an output of the A/D converter, and a logic circuit responsive to the output of the decision circuit to apply a logical operation to a decision signal derived from the A/D converter and which decides whether or not the baseband signal shifts from a level corresponding to the optimum sampling point, thereby producing the control signal for the voltage controlled oscillator. According to this circuit the regenerated timing signal contains only a negligible amount of jitter components and always maintains an optimum timing without using any phase adjustment.

5 Claims, 15 Drawing Figures

TIMING SYNCHRONIZING CIRCUIT FOR DEMODULATORS

BACKGROUND OF THE INVENTION

This invention relates to a timing synchronizing circuit for regenerating a timing signal from a baseband signal subjected to bandwidth limitation.

For converting a modulated signal demodulated by a demodulator utilized in a digitial carrier wave transmission system into a digital signal, a timing signal is necessary. Various means have been proposed for regenerating the timing signal, and a circuit to be described later can regenerate a timing signal containing a small proportion of jitter components but this circuit requires phase adjustment.

SUMMARY OF THE INVENTION

Accordingly, it is an object of this invention to provide a novel timing synchronizing circuit capable of obtaining a regenerated timing signal containing less jitter components and always maintaining an optimum timing without using phase adjustment.

According to this invention, there is provided a timing synchronizing circuit wherein a timing signal is regenerated from a baseband signal subjected to a bandwidth limitation, characterized in that there are provided a voltage controlled oscillator whose oscillation frequency varies in accordance with a control signal, an A/D converter which samples and shapes the baseband signal by utilizing the output of the voltage controlled oscillator, a decision circuit for deciding the polarity of a differential coefficient of the baseband signal at an optimum sampling point on the basis of an output of the A/D converter, and a logic circuit responsive to the output of the decision circuit to apply a logical operation to a decision signal derived from the A/D converter and which decides whether or not the baseband signal shifts from a level corresponding to the optimum sampling point, thereby producing the control signal for the voltage controlled oscillator.

BRIEF DESCRIPTION OF THE DRAWINGS

In the accompanying drawings:

FIG. 3b shows sampling points for the waveforms shown in FIG. 3a;

DESCRIPTION OF THE PREFERRED EMBODIMENTS

Figure 1:
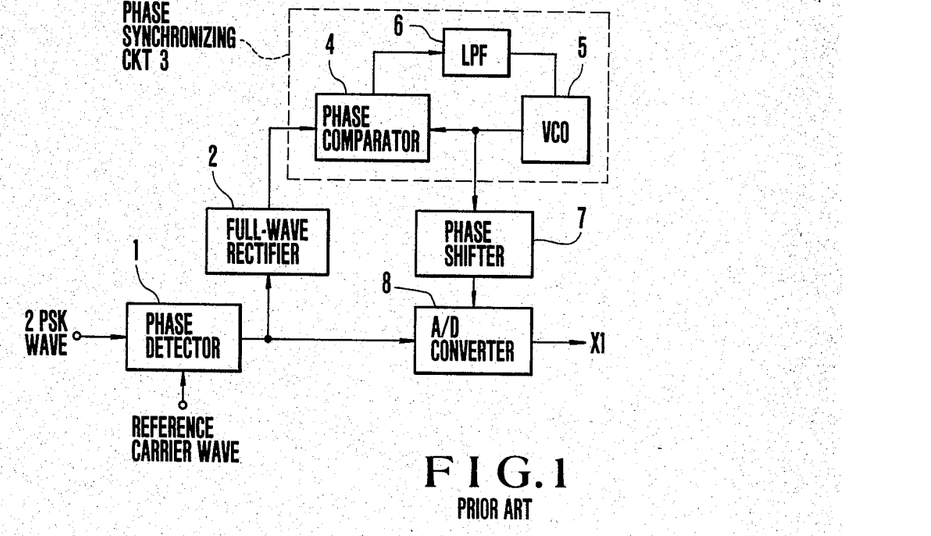
FIG. 1 is a block diagram showing a prior art timing synchronizing circuit.

Firstly, a prior art timing signal regenerating circuit will be described with reference to FIG. 1. This circuit comprises a full-wave rectifier 2; a phase synchronizing circuit 3 including a phase comparator 4, a voltage controlled oscillator 5 and a low-pass filter 6; a phase shifter 7; and a one bit A/D converter 8. FIG. 1 shows a case wherein the modulation wave is a two-phase PSK wave. This circuit operates as follows. An inputted PSK signal is demodulated at a phase detector 1 by using a reference carrier wave to produce a two-value baseband signal. The demodulated baseband signal is supplied to the full-wave rectifier 2 where the frequency of the demodulated baseband signal is doubled to extract a timing signal. The extracted signal is then supplied to the ordinary phase synchronizing circuit 3 to obtain a regenerated timing signal containing less jitter components, the regenerated timing signal being phase synchronized with the extracted timing signal and limited in a narrow bandwidth. The output of the phase synchronizing circuit 3 is supplied to the A/D converter 8 via the phase shifter 7 and used as the timing signal for sampling and shaping the demodulated baseband signal. At this time, it is necessary to adjust the phase of the regenerated timing signal with the phase shifter 7 so that the demodulated baseband signal would be sampled at an optimum timing. With this circuit, although it is possible to regenerate a timing signal containing less jitter components, it is necessary to adjust the phase.

The invention contemplates provision of an improved timing synchronizing circuit not requiring phase adjustment.

Figure 2:
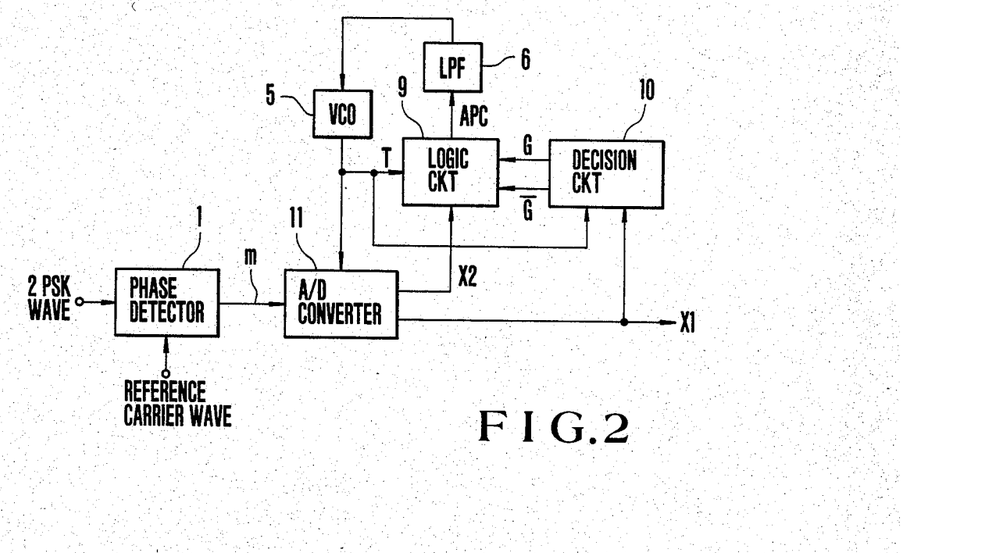
FIG. 2 is a block diagram showing one embodiment of the timing synchronizing circuit according to this invention.
Figure 3A:
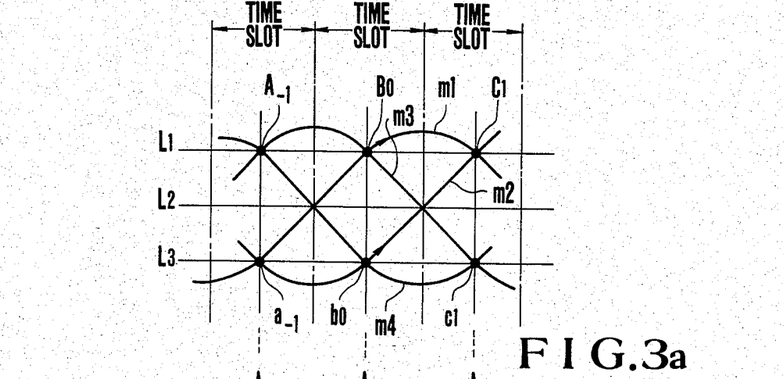
FIG. 3a shows waveforms useful to explain the operation of the circuit shown in FIG. 2.

A preferred embodiment of a timing signal synchronizing circuit of this invention shown in FIG. 2 comprises a voltage cotrolled oscillator 5, a low-pass filter 6, a logic circuit 9, a decision circuit 10, and a two-bit A/D converter 11. FIG. 3a shows waveforms for explaining the operation of the embodiment shown in FIG. 2.

The operation of this embodiment will now be described. It is now assumed that the demodulated baseband signal m of the output of the phase detector 1 has been somewhat subjected to bandwidth limitation, and that the baseband signal contains signals $m_1$ to $m_4$ having waveform response as shown in FIG. 3a. Such a demodulated baseband signal is sampled by the A/D converter 11 and converted into data signals $X_1$ and $X_2$ according to reference levels $L_1$, $L_2$ and $L_3$. The reference level $L_2$ is typically zero volt and binary value of the data signal $X_1$ is determined with respect to this level $L_2$. At the levels $L_1$ and $L_3$, the maximum margin for the signals $m_1$ to $m_4$ is obtained. The relation among the demodulated baseband signal m and data signals $X_1$ and $X_2$ is as shown in the following Table I. The data signal $X_2$ which takes a binary value according to Table I serves to decide whether or not the baseband signal m, particularly, signals $m_1$ to $m_4$ shift from levels corresponding to optimum sampling points $A_{-1}$, $a_{-1}$, $B_0$, $b_0$, $C_1$ and $c_1$ meeting the maximum margin.

TABLE I

| Demodulated baseband signal m | $X_1$ | $X_2$ |
|---|---|---|
| $m > L_1$ | 1 | 1 |
| $L_2 < m < L_1$ | 1 | 0 |
| $L_3 < m < L_2$ | 0 | 1 |
| $m < L_3$ | 0 | 0 |

Figure 3B:
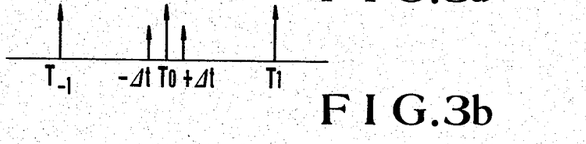

In FIG. 3b, $T_{-1}$, $T_0$ and $T_1$ represent optimum sampling points throughout 3 time slots. When the signals $m_1$ to $m_4$ having waveform response are sampled at the optimum sampling points $T_{-1}$, $T_o$ and $T_1$ meeting the maximum margin, the binary value "1" or "0" of the data signal $X_2$ that decides whether or not the demodulated baseband signal m shifts from levels corresponding to the optimum sampling points would be outputted at an equal probability. However, when the baseband signal is sampled at a timing $T_o + \Delta t$ or $T_0 - \Delta t$, the data signal $X_2$ assumes binary values as shown in the following Table II in accordance with waveforms of the baseband signal.

TABLE II

| sampling point | waveform Data Signal $X_2$ | | | |
|---|---|---|---|---|
| | $m_1$ | $m_2$ | $m_3$ | $m_4$ |
| $T_0 + \Delta t$ | 1 | 1 | 0 | 0 |
| $T_0 - \Delta t$ | 0 | 0 | 1 | 1 |

Table II shows that for the signals $m_1$ and $m_2$ having a positive differential coefficient at point $T_0$, the data signal $X_2$ is always "1" when the sampling point shifts from the optimum sampling point by $+\Delta t$ whereas the data signal $X_2$ is always "0" when the sampling point shifts by $-\Delta t$. On the other hand, for the signals $m_3$ and $m_4$ having a negative differential coefficient at point $T_0$, the polarity of the data signal $X_2$ is inverted in comparison with the polarity of the data signal $X_2$ obtained with the signal $m_1$ and $m_2$. Therefore, the data signal $X_2$ for the signals $m_3$ and $m_4$ is made identical to that for the signals $m_1$ and $m_2$ by inverting the polarity of the data signal $X_2$. As described above, when the polarity of the differential coefficient of the demodulated baseband signal at an optimum sampling point $T_0$ is decided, and when a logical operation is executed according to results of the decision, a signal representative of a result of the logical operation can be used as an error signal which detects shifting of the sampling point. The decision circuit 10 shown in FIG. 2 decides gradients of signals $m_1$ to $m_4$, and provides output signals G and $\overline{G}$ deciding the gradients of the signals $m_1$ to $m_4$. The output signal G becomes "1" for the signals $m_1$ and $m_2$ whereas the output signal $\overline{G}$ becomes "1" for $m_3$ and $m_4$. The logic circuit 9 includes a circuit which inverts the polarity of the signal $X_2$ when the signal $\overline{G}$ is "1" and holds a data signal $X_2$ which corresponds to one of the signals $m_1$ to $m_4$ and occurs in the nearest precedence when both the signals G and $\overline{G}$ are zero. The output of the logic circuit 9 produces an error signal APC that detects the shifting of the sampling point in the A/D converter 11. Accordingly, when the output of the logic circuit 9 is supplied through the low-pass filter 6 to the voltage controlled oscillator 5 as a control signal, the circuit shown in FIG. 2 always supplies a timing signal to the A/D converter 11 at an optimum timing.

Figure 4:
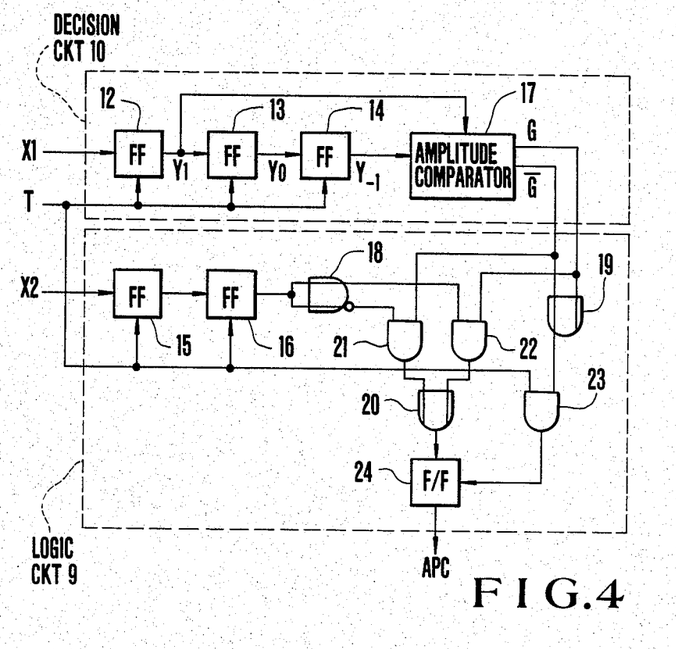
FIG. 4 is a block diagram showing examples of a decision circuit and a logic circuit shown in FIG. 2.

FIG. 4 is a block diagram showing preferred examples of the logic circuit 9 and the decision circuit 10 in which reference numerals 12 to 16 and 24 designate D type flip-flop circuits, 17 an amplitude comparator, 18 an OR/NOR gate circuit, 19 and 20 OR gate circuits and 21 to 23 AND gate circuits. The flip-flop circuits 12 and 14 act as a 3-bit memory circuit, and the outputs $Y_1$ and $Y_{-1}$ of the flip-flop circuits 12 and 14 are inputted to the amplitude comparator 17. The amplitude comparator 17 decides the polarity of the differential coefficient of the demodulated baseband signal at the optimum sampling point $T_0$ in the A/D converter by comparing data at points $T_{-1}$ and $T_1$. Thus, when the data signal $X_1$ changes from "0" to "1" at the reference level $L_2$, the polarity of the differential coefficient is positive whereas when the data signal $X_1$ changes from "1" to "0", the differential coefficient is negative. The output signals G and $\overline{G}$ deciding the gradients of the signals $m_1$ to $m_4$ are outputted from the amplitude comparator 17, wherein G becomes "1" for signals $m_1$ and $m_4$ while $\overline{G}$ becomes "1" for signals $m_3$ and $m_4$. When, that is, the gradient of the signal having the waveform response is positive, the gate circuits 20 to 22 pass the data signal $X_2$ without changing its polarity whereas when signal $\overline{G}$ is "1", that is, the gradient of the signal having the waveform response is negative, pass the data signal $X_2$ after inverting the polarity thereof. When either one of the signals G and $\overline{G}$ is "1", AND gate circuit 23 sends out a timing signal whereas when signals G and $\overline{G}$ are both "0", indicating that the waveform response signal is flat the output of the AND gate circuit 23 is "0". Consequently, for the waveform response signals $m_1$ to $m_4$, the flip-flop circuit 24 outputs the output of OR gate circuit 20 as it is and in the case other than $m_1$ to $m_4$, the flip-flop circuit 24 holds a data signal $X_2$ which corresponds to one of the signals $m_1$ to $m_4$ and occurs in the nearest precedence.

Figures 5, 6:
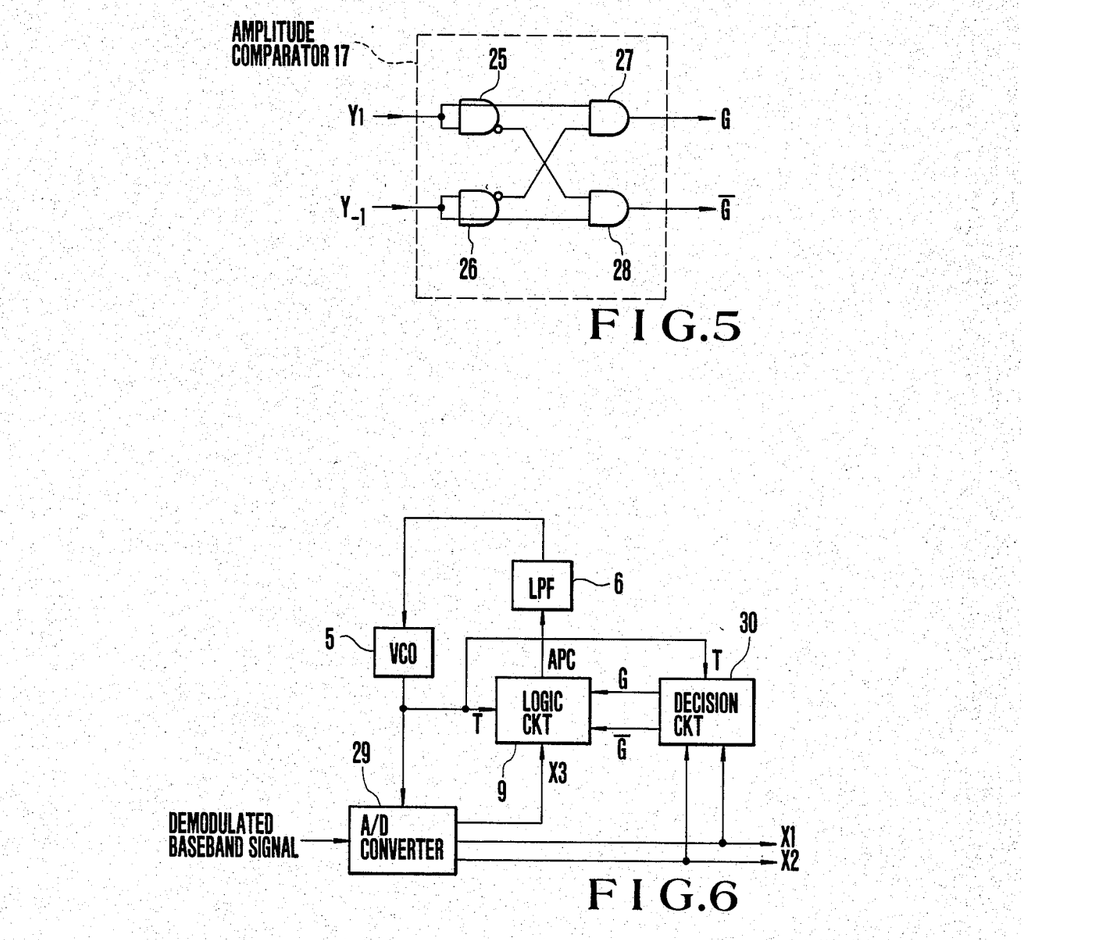
FIG. 5 is a connection diagram of an amplitude comparator shown in FIG. 4.
FIG. 6 is a block diagram showing a modification of the timing synchronizing circuit according to this invention.

FIG. 5 shows an example of the amplitude comparator 17 which comprises OR/NOR gate circuits 25 and 26, and AND gate circuits 27 and 28.

FIG. 6 shows an embodiment in which the demodulated baseband signal obtained by detecting a QAM wave has four values. In this embodiment, 3-bit A/D converter 29, and a corresponding decision circuit 30 are used.

Figure 7:
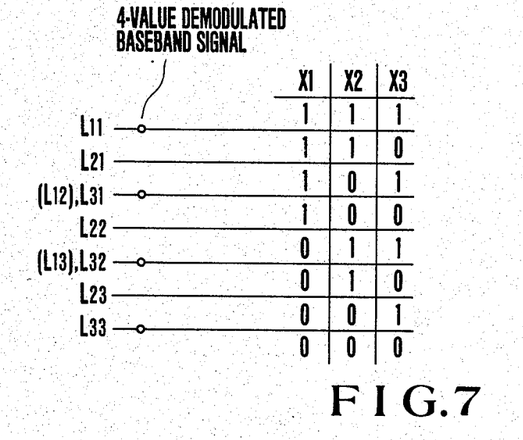
FIG. 7 is a diagram for explaining the operation of the modification shown in FIG. 6.

FIG. 7 is a table for explaining the operation of the circuit shown in FIG. 6 and shows the four-value baseband signal in relation to outputs $X_1$ to $X_3$ of the converter 29. Four values are present at reference levels $L_{11}$, $L_{31}$ ($L_{12}$), $L_{32}$ ($L_{13}$) and $L_{33}$ representative of the maximum margin for four values. Levels $L_{21}$ and $L_{23}$ are reference levels with respect to which binary values "1" and "0" of data signal $X_2$ are determined. Similarly, level $L_{22}$ is a reference level with respect to which binary values "1" and "0" of data signal $X_1$ are determined. Data signal $X_3$ serves to decide whether or not waveform response signals shift from levels corresponding to optimum sampling points. Thus, for the demodulated baseband signal having four values, the data signal $X_3$ is inputted to the logic circuit 9. The decision circuit 30 outputs signals G and $\overline{G}$ having the same performance as those shown in FIG. 2 and these output signals are inputted to the logic circuit 9. Consequently, the logic circuit 9 outputs an error signal APC that detects shifting of the sampling point. When this error signal is applied to the voltage controlled oscillator 5 as a control signal, the circuit shown in FIG. 6 can be applied to the four-value demodulated baseband signal. Then, the circuit operates as a timing synchronizing circuit.

Figure 8:
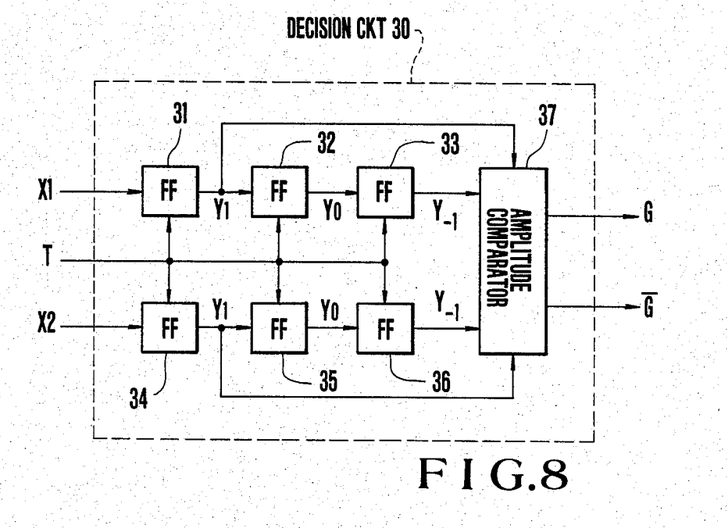
FIG. 8 is a block diagram showing a decision circuit shown in FIG. 6.

FIG. 8 shows an example of the decision circuit 30 comprising D type flip-flop circuits 31 to 36 and an amplitude comparator 37. The decision circuit operates as follows. As the outputs of flip-flop circuits 31 and 34 can be obtained data $Y_1$ of the signals $X_1$ and $X_2$ at time $T_1$ while data $Y_{-1}$ of signals $X_1$ and $X_2$ at time $T_{-1}$ can be obtained as the outputs of flip-flop circuits 33 and 36 so that these outputs are applied to the amplitude comparator 37 so as to decide the polarity of the differential coefficient of the demodulated baseband signal. Let us denote the four-value signal at time $T_{-1}$ by $AT_{-1}$, the four-value signal at time $T_1$ by $AT_1$, $AT_1 - AT_{-1} = M$ is calculated by the amplitude comparator 37. When M is positive, that is, when the differential coefficient at time $T_0$ is positive, output G is "1", whereas when M is negative, that is, when the differential coeffcient at a time $T_0$ is negative, output $\overline{G}$ is "1". The four-value signals $AT_{-1}$ and $AT_1$ can be obtained by the logical operation of the outputs of flip-flop circuits 31, 33, 34 and 36.

Although, in the foregoing description, embodiments of this invention applicable to two-value and four-value demodulated baseband signal have been described, it should be understood that the invention is also applicable to much more valued baseband signals. For example, in the case of a 4-phase PSK wave, the PSK wave is branched into two having 90 degree phase difference and then the branched waves are supplied to the circuit shown in FIG. 2. In the case of a 16-value QAM wave, the QAM is branched into two having 90 degree phase difference and these two branched waves are supplied to the circuit shown in FIG. 6 respectively via detectors.

As described above, this invention is applicable to a baseband signal subjected to a bandwidth limitation. In the embodiments, it is assumed that waveform response signals as shown in FIG. 3a occur as a result of the bandwidth limitation but it will be clear that as the condition for limiting the bandwidth varies, the waveform response signals shown in FIG. 3a vary. In such a case, it is necessary to modify the decision circuit 10 or 30 so as to satisfy the condition. In the embodiments shown in FIGS. 2 and 6, a timing synchronizing circuit utilized in a digital carrier wave transmission system was described, but it should be understood that the invention is not limited to such an application, and the invention is also applicable to a baseband transmission system in which a baseband signal as shown in FIG. 3a is transmitted. Examples of the decision circuits were shown in FIGS. 4 and 8, the decision circuit being required to have a performance that decides the polarity of the differential coefficient of the baseband signal at the sampling time. Accordingly, various means other than those shown in FIGS. 4 and 8 can be used.

Practically, the timing synchronizing circuit of the present invention described previously has widespread applications in obtaining data signals from 4-PSK wave, 16 QAM wave, or 64 QAM wave.

Figure 9:
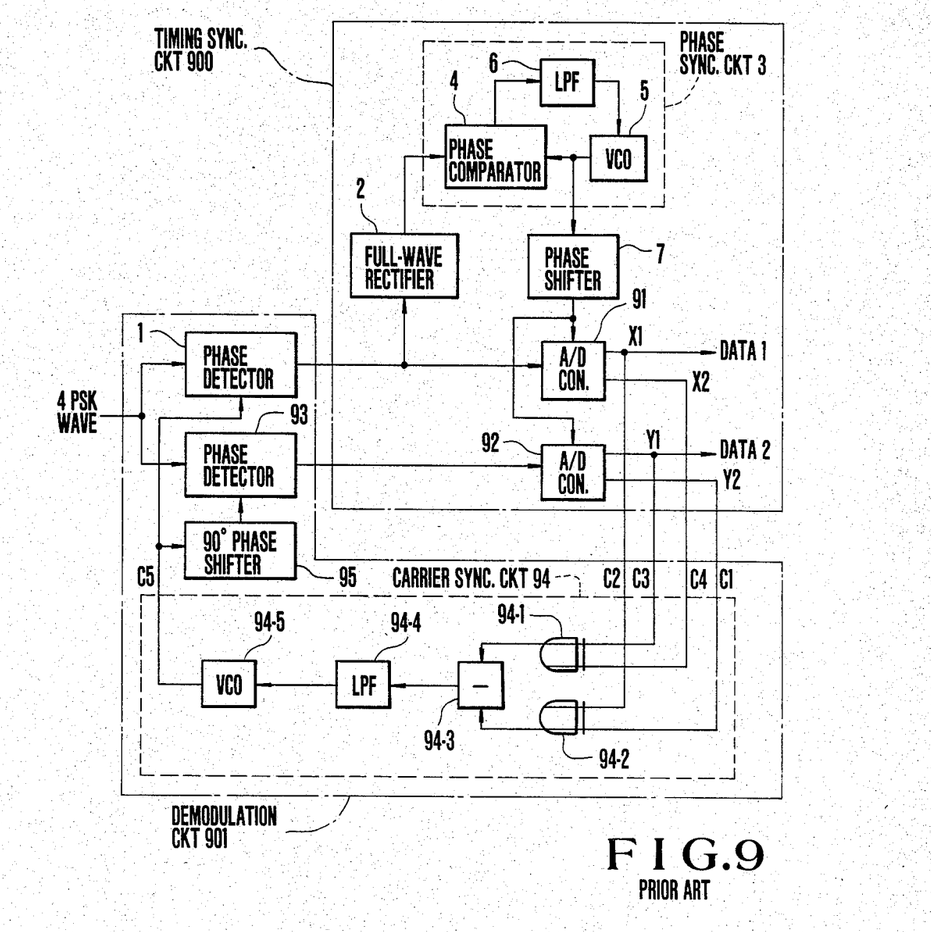
FIG. 9 is a block diagram showing a prior art demodulator apparatus including a timing synchronizing circuit and a demodulation circuit in combination, which is adapted for demodulation of 4 PSK (4-phase phase shift keying) waves.

Thus, a prior art demodulation apparatus for 4 PSK wave as shown in FIG. 9 has been available which includes a timing synchronizing circuit 900 being the same as that of FIG. 1 with the only exception that an A/D converter 91 is a two-bit A/D converter and an additional channel comprised of a phase detector 93 and an A/D converter 92 is provided for generation of data 2, and a demodulation circuit 901. The demodulation circuit 901 comprises a carrier synchronizing circuit 94 responsive to the output data signals of the timing synchronizing circuit 900 to produce a reference carrier frequency, and a phase detector 1 and another phase detector 93 which respectively respond to the reference carrier frequency directly and via a 90 degree phase shifter 95 so as to demodulate a 4 PSK wave applied to the phase detectors 1 and 93.

The carrier synchronizing circuit 94 comprises a section including an exclusive OR gate 94-1 with its inputs connected via terminals $C_3$ and $C_4$ to a data signal $Y_1$ from the A/D converter 92 and a data signal $X_2$ from the A/D converter 91, an exclusive OR gate 94-2 with its inputs connected via terminals $C_2$ and $C_1$ to a data signal $X_1$ from the A/D converter 91 and a data signal $Y_2$ from the A/D converter 92, and a subtractor 94-3 applied with outputs of the exclusive OR gates 94-1 and 94-2. This section is responsive to the outputs of the A/D converters 91 and 92 to generate an error signal for detecting the rotational direction of the respective waveform response signals of the 4 PSK wave. In addition to this error signal generating section, the carrier synchronizing circuit 94 has a low-pass filter 94-4 responsive to the output of the subtractor 94-3, and a voltage controlled oscillator 94-5 controlled by the output of the low-pass filter to produce the reference carrier frequency supplied to the phase detector 1 and 90 degree shifter 95 via a terminal $C_5$.

The carrier synchronizing circuit 94 operates as follows. Data signals $Y_2$ and $X_1$ are exclusive ORed at the exclusive OR gate 94-2 so that this gate 94-2 produces an output "0" when the respective waveform response signals of the 4 PSK wave rotate counterclockwise. Data signals $X_2$ and $Y_1$ are exclusive ORed at the exclusive OR gate 94-1 which, in turn, produces an output "1" when the respective waveform response signals rotate counterclockwise. Thus, by subtracting the output signals of the two exclusive OR gates 94-1 and 94-2 at the subtractor 94-3, a "0" signal of doubled level can be obtained. This doubled "0" level output is passed through the low-pass filter 94-4 for suppression of noises and supplied to the voltage controlled oscillator 94-5 which then produces a carrier signal in synchronism with the input 4 PSK wave.

With the FIG. 9 demodulation apparatus, the input 4 PSK wave can be demodulated at the demodulation circuit 901 and converted into data 1 and 2 at optimum sampling points at the timing synchronizing circuit 900. Disadvantageously, this demodulation apparatus requires phase adjustment as described with reference to FIG. 1.

FIGS. 10 to 14 show various embodiments of demodulation apparatus according to the present invention which can obviate the prior art drawback. Throughout FIGS. 10 to 14, demodulation circuits 109, 113, 123, 133 and 143 each including a carrier synchronizing circuit 94, phase detectors 103 and 104, and a 90 degree phase shifter 107 have the same construction as that of the demodulation circuit 901 shown in FIG. 9 but the connection of the demodulation circuit to timing synchronizing circuit 108, 112, 122, 132 or 142 is different from the connection of the demodulation circuit 901 to the timing synchronizing circuit 900 shown in FIG. 9.

Figure 10:
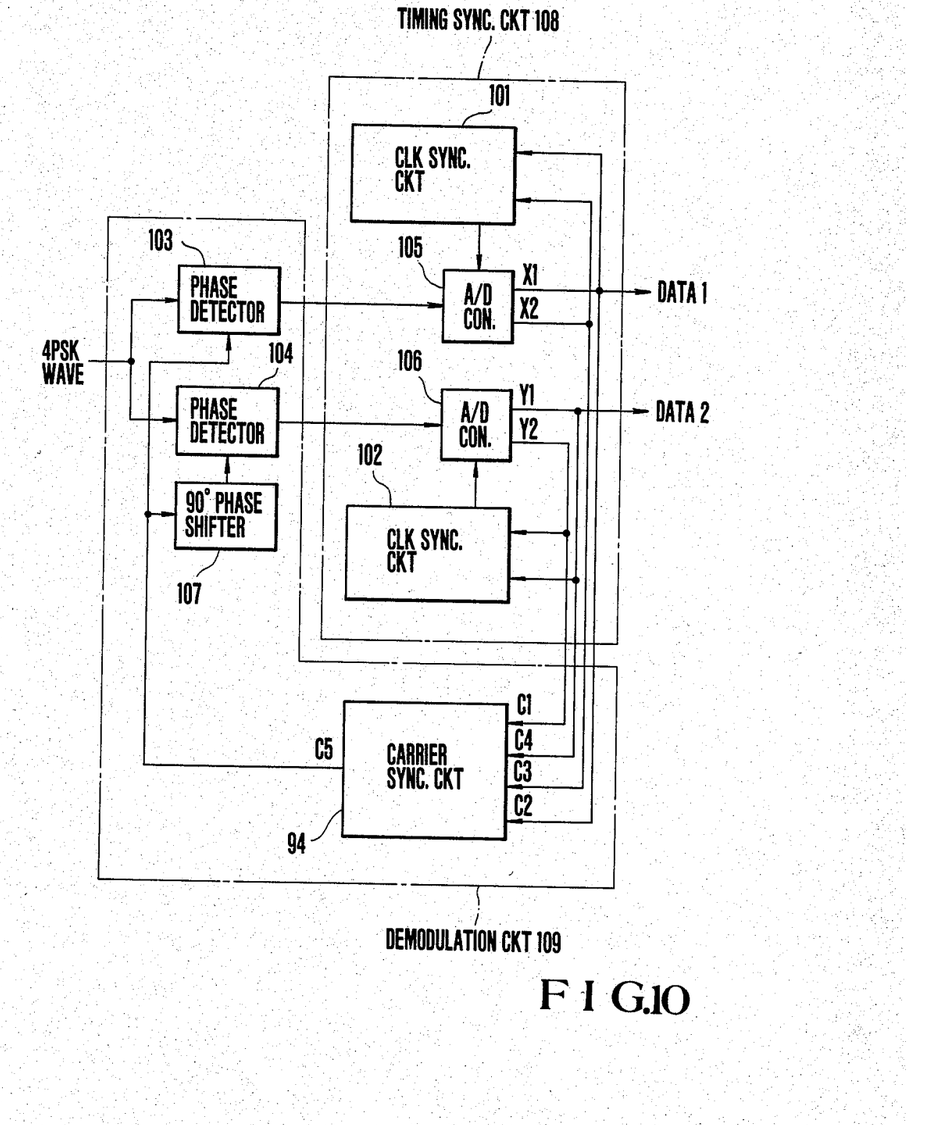
FIG. 10 is a block diagram showing a first embodiment of demodulator apparatus according to the present invention which is adapted for demodulation of 4 PSK waves.

FIG. 10 shows an embodiment of demodulation apparatus of the invention adapted for demodulation of 4 PSK waves. The timing synchronizing circuit 108 is constituted by clock synchronizing circuits 101 and 102, and A/D converters respectively associated with the circuits 101 and 102. Each of the clock synchronizing circuits 101 and 102 includes a voltage controlled oscillator 5, a low-pass filter 6, a logic circuit 9 and a decision circuit 10 connected to each of the A/D converters 105 and 106 in the same manner as in FIG. 2. Data signals $X_1$ standing for data 1 and $X_2$ from the A/D converter 105 are also applied to the carrier synchronizing circuit 94 via terminals $C_2$ and $C_3$, and data signals $Y_1$ standing for data 2 and $Y_2$ from the A/D converter 106 are also applied to the carrier synchronizing circuit 94 via terminals $C_4$ and $C_1$.

Figure 11:
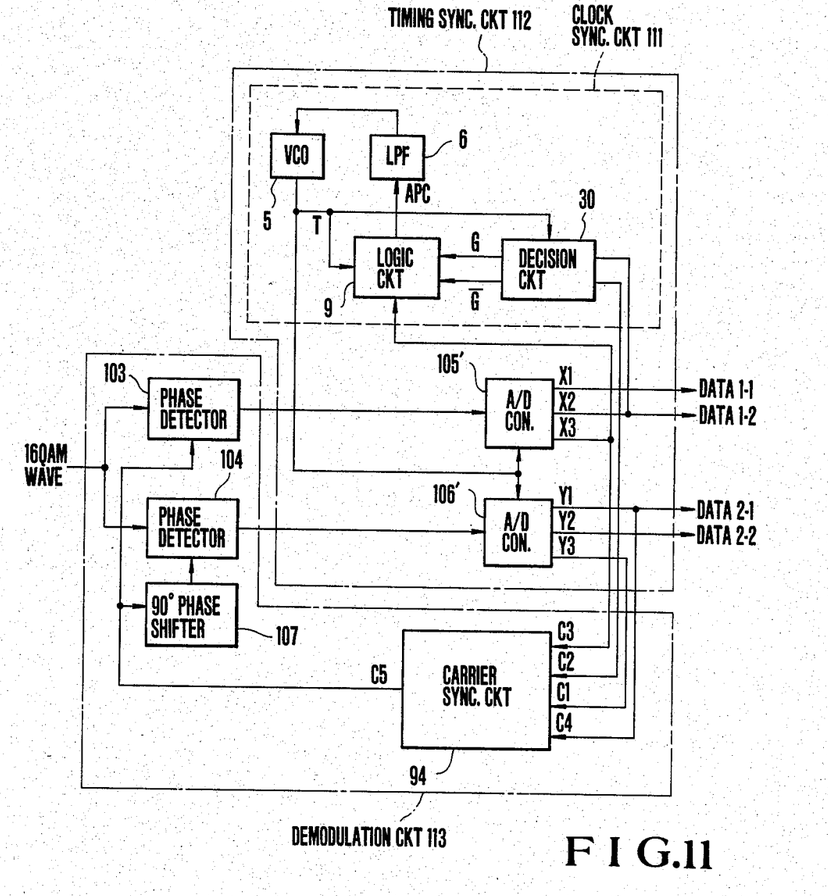
FIG. 11 is a block diagram showing a second embodiment of demcodulator apparatus according to the present invention adapted for demodulation of 16 QAM (16-level quadrature amplitude modulation) waves.

FIG. 11 shows an embodiment of demodulation apparatus of the invention adapted for demodulation of 16 QAM waves. In this embodiment, a timing synchronizing circuit 112 includes a clock synchronizing circuit 111 including a voltage controlled oscillator 5, a low-pass filter 6, a logic circuit 9 and a decision circuit 30 connected to each of the A/D converters 105' and 106' in the same manner as in FIG. 6. Data signals $X_1$ standing for data 1-1 and $X_3$ from the A/D converter 105' are also applied to the carrier synchronizing circuit 94 via terminals $C_2$ and $C_3$, data signals $Y_1$ standing for data 2-1 and $Y_3$ from the A/D converter 106' are also applied via terminals $C_4$ and $C_1$.

Figure 12:
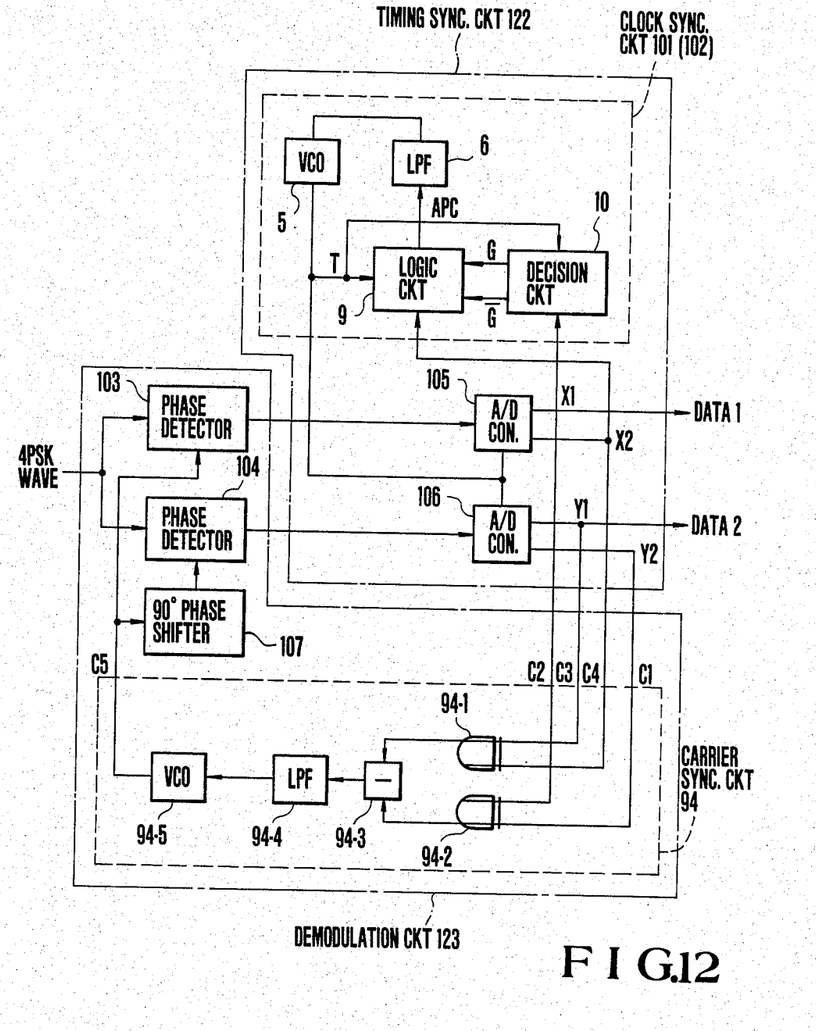
FIG. 12 is a block diagram showing a third embodiment of demodulator apparatus of the invention adapted for demodulation of 4 PSK waves.

The FIG. 10 embodiment is modified as shown in FIG. 12 which is different therefrom in that the timing signal is supplied in common to the two A/D converters 105 and 106, thereby ensuring that only one clock synchronizing circuit 101 (102) can suffice.

Figure 13:
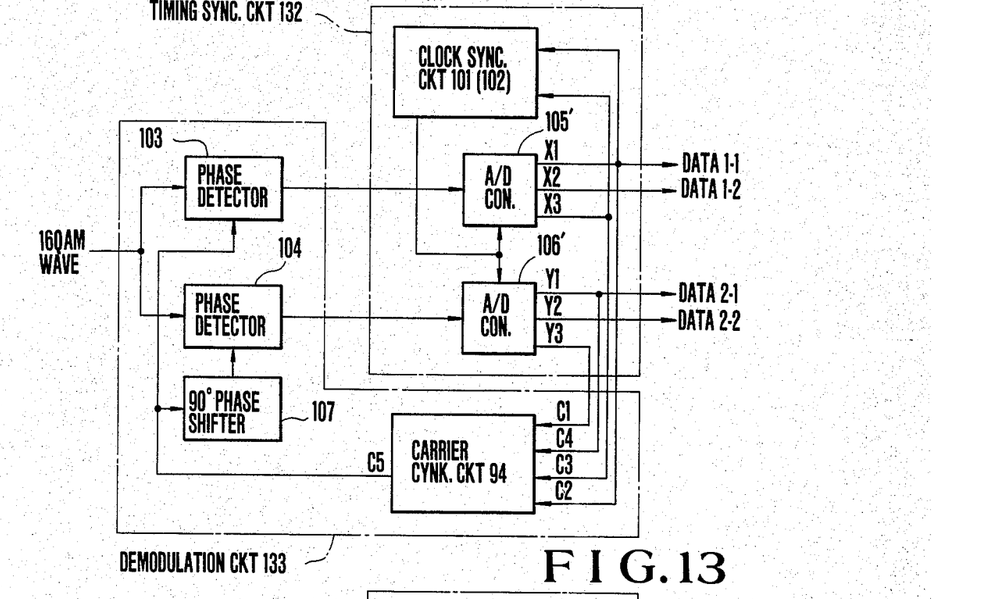
FIG. 13 is a block diagram showing a fourth embodiment of demodulator apparatus of the invention adapted for demodulation of 16 QAM waves.

The FIG. 11 embodiment is modified as shown in FIG. 13. This modification is different from the FIG. 11 embodiment in that the clock synchronizing circuit 111 is replaced with the circuit 101 (102) to simplify the circuit construction.

Figure 14:
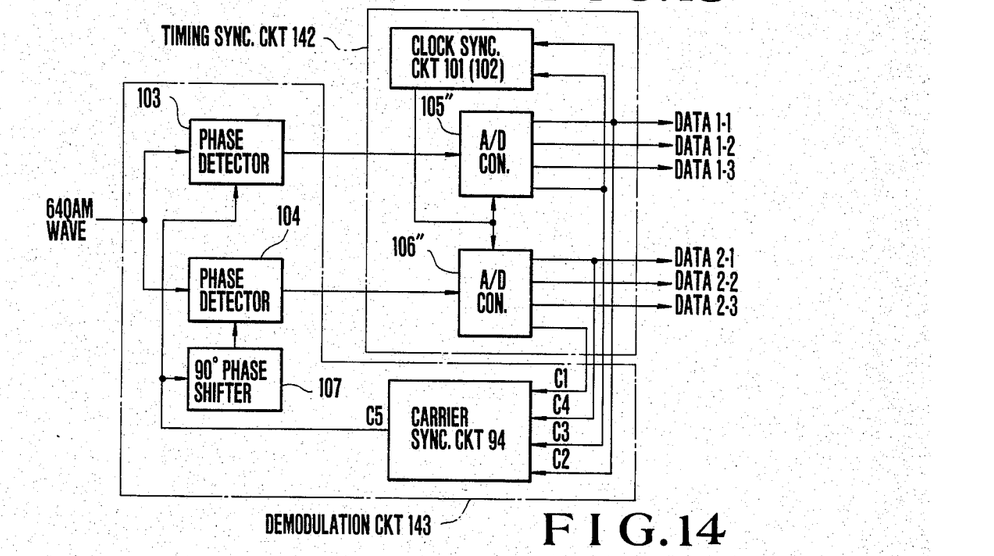
FIG. 14 is a block diagram showing a fifth embodiment of demodulator apparatus of the invention adapted for demodulation of 64 QAM waves.

FIG. 14 shows an embodiment of demodulation apparatus according to the present invention which is adapted for demodulation of 64 QAM waves. This embodiment is the same as the FIG. 13 embodiment with the only exception that the bit number of the A/D converters 105'' and 106'' is increased.

What is claimed is:

1. A timing synchronizing circuit for regenerating a timing signal from a baseband signal subjected to a bandwidth limitation, comprising:

voltage controlled oscillator means responsive to a control signal for providing said timing signal;

A/D converter means responsive to said timing signal for sampling said baseband signal and converting it into a plurality of digital signals;

decision circuit means responsive to an output of said A/D converter means for deciding the polarity of a differential coefficient of said baseband signal at an optimum sampling point; and logic circuit means responsive to the output of said decision circuit means for deciding whether or not said baseband signal shifts from a level corresponding to said optimum sampling point, thereby providing said control signal.

2. A timing synchronizing circuit according to claim 1 wherein said control signal is applied to said voltage controlled oscillator via a low-pass filter.

3. A demodulation apparatus comprising in combination a demodulation circuit for demodulating a carrier wave modulated with a baseband signal subjected to a bandwidth limitation and a timing synchronizing circuit for regenerating a timing signal from the demodulated baseband signal;

said timing synchronizing circuit including a plurality of A/D converter means responsive to said timing signal for sampling said demodulated baseband signal and providing a plurality of digital signals; and at least one clock synchronizing circuit including a voltage controlled oscillator responsive to a control signal for providing said timing signal, a decision circuit reponsive to said timing signal and an output of said A/D converter means for deciding the polarity of a differential coefficient of said baseband signal at an optimum sampling point, and a logic circuit responsive to said timing signal, the output of said decision circuit and the output of said A/D converter means, for deciding whether or not said baseband signal shifts from a level corresponding to said optimum sampling point, thereby providing said control signal;

said demodulation circuit including a carrier synchronizing circuit responsive to the outputs of said timing synchronizing circuit for providing a reference carrier wave, a pair of phase detectors for detecting the modulated carrier wave with said reference carrier wave and providing said demodulated baseband signal.

4. A demodulation apparatus according to claim 3 comprising a plurality of clock synchronizing circuits respectively associated with the plurality of A/D converters.

5. A demodulation apparatus according to claim 3 wherein said A/D converters are responsive to the timing signal produced from a single clock synchronizing circuit.

* * * * *